United States Patent [19]
Jones

[11] 3,984,967
[45] Oct. 12, 1976

[54] MECHANICAL SAFETY INTERLOCK FOR PREVENTING MOWER OPERATION DURING REVERSE TRAVEL

[75] Inventor: Kenneth R. Jones, Thiensville, Wis.

[73] Assignee: Allis-Chalmers Corporation, Milwaukee, Wis.

[22] Filed: Dec. 22, 1975

[21] Appl. No.: 643,314

[52] U.S. Cl. ............................... 56/11.8; 192/3.63
[51] Int. Cl.² .................................... A01D 75/20
[58] Field of Search ................. 56/11.7, 11.8, 10.2, 56/10.5, 11.3, 11.6, 208, DIG. 15, DIG. 22; 180/82 R, 82 A, 103; 192/3.63

[56] References Cited
UNITED STATES PATENTS
2,899,793    8/1959    Swisher ........................... 56/11.3 X
2,960,810    11/1960   Musgrave ........................... 56/11.3

Primary Examiner—J.N. Eskovitz
Attorney, Agent, or Firm—Charles L. Schwab

[57] ABSTRACT

A tractor and mower combination is provided with a mechanical interlock between the manual control for the clutch in the mower drive and the manual control for the forward-reverse transmission to prevent operation of the mower during reverse travel of the tractor and to prevent the transmission control from being placed in a reverse travel position when the mower is being operated.

8 Claims, 3 Drawing Figures

MECHANICAL SAFETY INTERLOCK FOR PREVENTING MOWER OPERATION DURING REVERSE TRAVEL

BACKGROUND OF THE INVENTION

Heretofore others have provided means for automatically raising an implement out of its working position during reverse travel of a motorized carrier. Such an arrangement is shown in U.S. Pat. No. 3,176,777. U.S. Pat. No. 3,808,784 provides a reverse drive lockout mechanism for a combine harvester having a crop-gathering platform which is provided with ground-engaging control fingers. The lockout mechanism prevents the harvester from being driven in reverse when the control fingers are in ground proximity.

BRIEF DESCRIPTION OF THE INVENTION

A tractor-mounted mower is driven by the engine of the tractor through a drive train which includes a manually controlled clutch. The drive wheels of the tractor are driven by the tractor engine by way of a transmission which includes a manually operated control. An interlock mechanism is provided between the manually operated clutch and the manually operated transmission control so as to prevent operation of the mower during reverse travel of the tractor. The control is also effective to prevent the manual transmission control from being placed in a reverse drive position so long as the drive to the mower is established by engagement of the mower drive clutch.

BRIEF DESCRIPTION OF THE DRAWINGS

One embodiment of the present invention is disclosed in the drawings wherein.

DETAILED DESCRIPTION OF THE INVENTION

Figure 1:
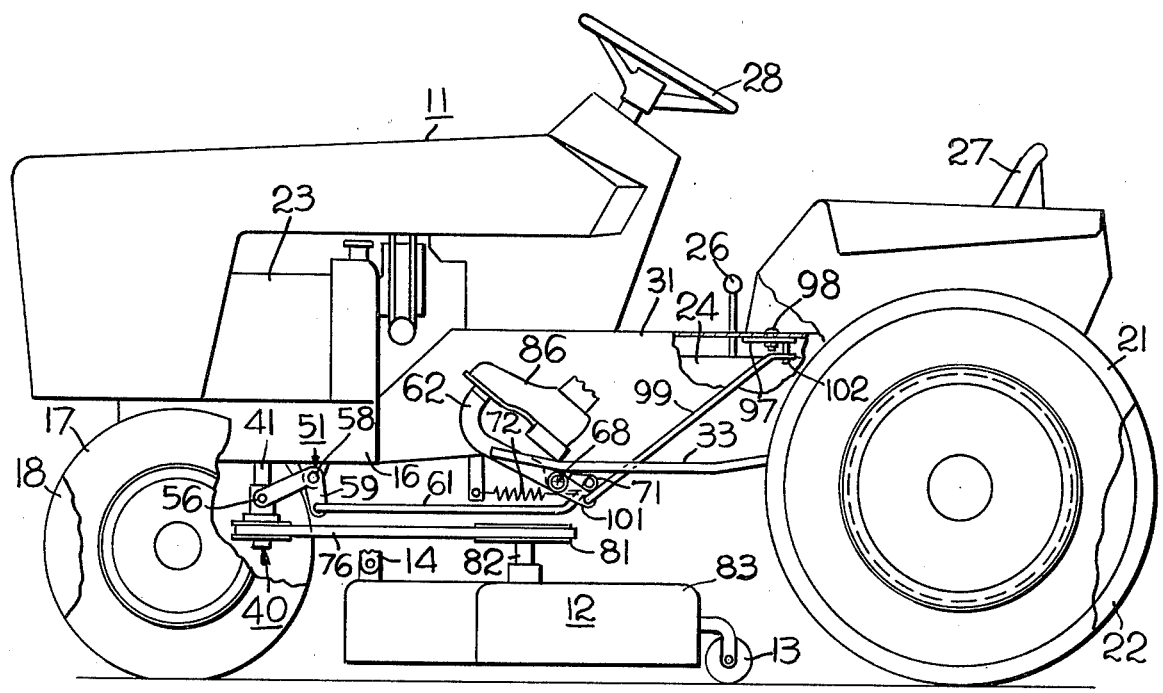
FIG. 1 is a side view of a lawn and garden tractor incorporating the present invention.

Referring to FIG. 1, a riding mower is illustrated which includes a lawn and garden tractor 11 with a mower unit 12 suspended there beneath. The underslung mower unit is supported at its rear end by ground-engaging wheels 13 and is pivotally connected at its forward end to a bracket 14 secured to the frame 16 of the tractor 11. The frame 16 of the tractor is supported at its front end by a pair of steerable wheels 17, 18; and is supported at its rear end by a pair of driven wheels 21, 22. The driven wheels 21, 22 are driven by a power unit in the form of an internal combustion engine 23 through a power train which includes a forward-reverse transmission 24 controlled by a manual control in the form of a gear shift lever 26. An operator's seat 27 is provided at the rear of the tractor and a suitable steering wheel 28 is provided for operating the steerable wheels 17, 18 through steering linkage (not shown). The operator sits in the seat with his legs straddling a tunnel-like frame part 31 within which the transmission 24 is located, and his feet may rest on floorboards 33, 34 provided on opposite sides of the part 31 of the frame 16.

Figure 3:
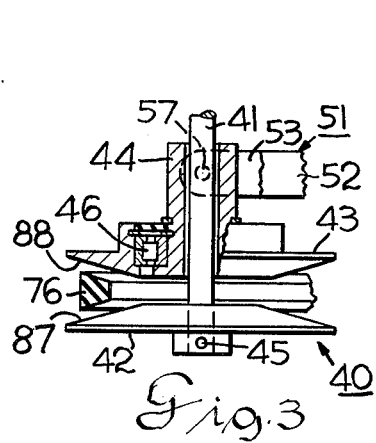
FIG. 3 is a sectional view of the mower drive clutch adjusted to a clutch disengaged position.

Referring also to FIG. 3, the output shaft 41 of the engine 32 has a lower half 42 of a split pulley clutch 40 secured thereto by a pin 45 so as to rotate therewith. An upper half 43 of the split pulley clutch 40 is rotatably journaled on an axially shiftable sleeve 44 by an antifriction bearing 46. The upper half 43 of the clutch 40 may be moved vertically relative to the lower half 42 by a bell crank structure 51 having a pair of arms 52, 53 in straddling relation to the sleeve 44 and pivotally connected to aligned studs 56, 57 extending outwardly from transversely opposite sides of the sleeve. The bell crank is pivotally connected to the tractor frame 16 by a transverse pin 58 and includes a downwardly extending arm 59, the lower end of which is pivotally connected to a clutch-operating link 61. The split pulley clutch is operated through the control linkage (comprised of the bell crank structure 51 and link 61) by a foot-operated pedal 62 pivotally supported in brackets 66, 67 on the frame 16 for pivotal movement about a transverse axis 68. The clutch-operating link 61 is pivotally connected at its rear end to an arm 71 of the clutch pedal 62. The pedal is resiliently biased toward a raised, clutch disengaged position by a tension spring 72 interconnected between the tractor frame and the link 61.

FIG. 3 shows the split pulley clutch in a disengaged position wherein the V-belt 76 associated therewith will be sufficiently loose so as not to impart any drive to the mower unit. That is, it will not impart rotating drive to the pulley 81 secured to the vertical mower shaft 82 operatively associated with cutting mechanism, not shown, within the housing 83 of the mower unit. When the operator places his left foot 86 on the pedal 62 and pushes it downwardly from a raised clutch disengaged position to a clutch engaged position the upper half 43 of the mower drive clutch will be moved downwardly to a clutch engaged position, as illustrated in FIG. 1, wherein the drive belt 76 will be tightened and will be engaged by the conical surfaces 87, 88 of the pulley halves 42, 43 thereby imparting driving torque to the mower 12 by way of a drive belt 76.

It will be noted in the clutch-engaged position, as shown in FIG. 1, that only a small amount of force will be needed from the operator's foot to maintain the clutch link 61 in its illustrated clutch-engaging position, inasmuch as the linkage is near an over-center condition. As the pedal 62 is moved from its clutch disengaged position to its clutch engaged position the operator has increasing mechanical advantage over the clutch operating linkage (link 61, structure 51). The effective lever arm of the tension spring 72 is reduced substantially as the clutch pedal 62 is depressed, and, thus the biasing effect of the spring 72 decreases as the clutch pedal is moved from its clutch disengaged position (FIG. 3) to its clutch engaged position (FIG. 1).

Figure 2:
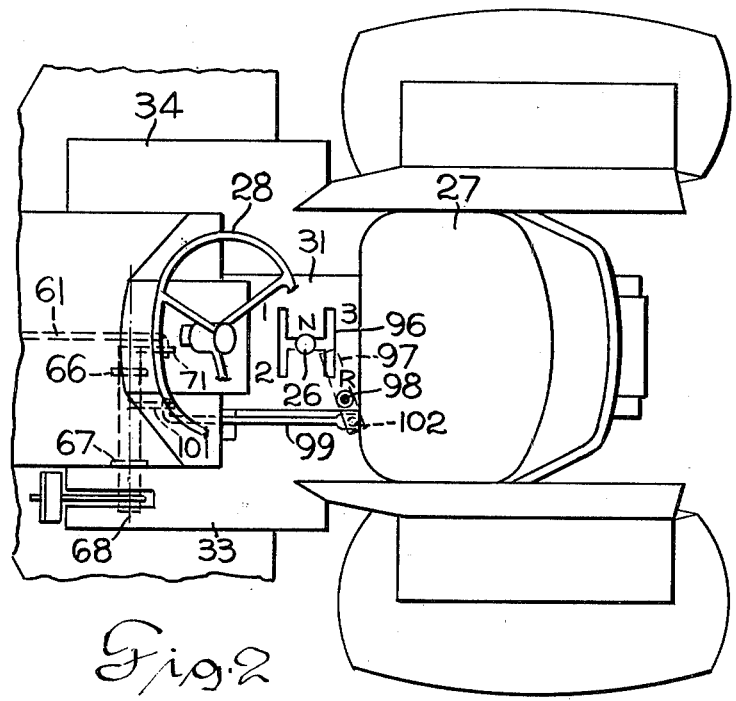
FIG. 2 is a partial top view of the tractor shown in FIG. 1.

Referring to FIG. 2, the manual gear shift lever 26 of the transmission extends upwardly through an H-shaped slot 96 in frame part 31 with finger portions for the shift lever's first, second and third forward speed positions, and for its reverse position (these positions being labeled (1, 2, 3 and R). The finger portions of the H-shaped slot are interconnected by a longitudinal portion labeled N which is where the shift lever 26 is disposed when in its neutral position. A locking element 97 is pivotally connected to the upper part of frame part 31 by a vertical pin 98, and, as shown in FIG. 2, it is blocking the reverse finger portion of slot 96 thereby preventing movement of lever 26 to its reverse position of adjustment. The positioning of the blocking element 97 is controlled by a link 99 interconnected between an arm 101 of the clutch pedal 62 and the blocking element 97. The link 99 is connected to th blocking element 97 by a vertical pin 102 which is disposed in spaced relation to the pin 98 so as to be capable of imparting pivotal movement to the blocking element 97. When the operator removes his foot 86 from the clutch pedal, the return spring 72 will return the clutch pedal to a raised clutch disengaged position and in so doing the link 99 will pivot the blocking element 97 clockwise, as viewed in FIG. 2, to an unblocking position in which the free end of the blocking element 97 is out of its underlying blocking relation with the reverse portion of the slot 96. Therefore, when the mower clutch is disengaged, the transmission control 26 can be moved to its reverse drive establishing position.

OPERATION OF THE INVENTION

When the driver wishes to operate the tractor in any one of the forward speeds, he will shift the control lever 26 to the first, second or third speed position in the H-shaped slot 96. To start mowing he will depress the mower clutch pedal 62 by placing his left foot 86 on the pedal thus moving the upper clutch half 43 downwardly to a clutch engaged position in which the driving belt 76 is engaged by the conical surfaces 87, 88 of the clutch halves 42, 43. It should be understood, of course, that only the clutch half 42 actually imparts driving torque to the belt 76. As the operator depresses the clutch pedal 62, it has increasing mechanical advantage in operating the clutch linkage and the biasing effect of the spring 72 decreases. Thus the operator only needs to exert a small downward force to maintain the clutch pedal in its depressed clutch engaged position. If the operator should leave the operator's station, the mower drive will be disengaged because the operator's foot will no longer be on the clutch pedal 62. If when mowing with the tractor in a forward travel the operator decides to place the tractor in reverse, he will not be able to do so unless he lifts his left foot from the mower clutch operating pedal 62 so as to move the blocking element 97 out of its interfering or blocking position. Upon releasing the clutch pedal 62, thereby disengaging the mower clutch, the blocking element 97 will pivot clockwise, as viewed in FIG. 2, to a nonblocking position thus permitting the control lever 26 to be moved to the portion of the slot 96 adjacent the letter "R." While travelling in reverse the operator will not be able to engage the mower drive clutch, because the lever 26 will prevent the blocking element from moving to the position illustrated in FIG. 2, and, therefore, the operator will not be able to depress the pedal 62 to its clutch-engaged position.

The embodiments of the invention in which an exclusive property or privilege is claimed are defined as follows:

1. In a tractor and mower combination including a power unit, a drive train to ground engaging wheels including a forward-reverse transmission and a drive train to the mower including a clutch, an interlock for preventing operation of the mower during reverse travel comprising:
   a manual transmission control for said transmission shiftable between forward and reverse positions wherein forward and reverse directions of travel of said tractor are effected,
   a manual clutch control shiftable between clutch engaged and clutch disengaged positions and,
   mechanical means interconnecting said clutch and transmission controls preventing shifting of said transmission control to its reverse position when said clutch control is in its clutch engaged position and preventing said clutch control from being moved to its clutch engaged position when said transmission control is in its reverse position.

2. The interlock of claim 1 wherein said transmission control includes a manual shift lever and said mechanical means includes a shiftable blocking element engagable with said shift lever.

3. The interlock of claim 2 wherein said mechanical means includes a link interconnecting said clutch control and said blocking element.

4. The interlock of claim 1 wherein said clutch control includes foot pedal structure pivotally connected to said tractor for vertical swinging movement from a clutch disengaged position to a clutch engaged position and resilient biasing means on said tractor connected to said pedal structure urging the latter toward its clutch disengaged position, whereby the mower is only driven when the foot pedal is held in its clutch engaged position.

5. The interlock of claim 4 wherein said clutch control is connected to said foot pedal by a mechanical clutch operating linkage.

6. The interlock of claim 4 wherein said foot pedal has increasing mechanical advantage in relation to said clutch operating linkage as said pedal is shifted from its clutch disengaged to its clutch engaged position whereby little effort is required of an operator to hold the foot pedal in its clutch engaged position.

7. The interlock of claim 6 wherein said resilient biasing means has decreasing biasing effect on said foot pedal as the latter is shifted from its clutch disengaged to its clutch engaged position.

8. The interlock of claim 1 wherein said transmission control includes a manually operated gear shift lever shiftable between forward drive and reverse drive positions and wherein said mechanical means includes a blocking element pivotally connected to said tractor adjacent said gear shift lever and pivotable between a nonblocking position in which said shift lever may be shifted to its reverse drive position and a blocking position in which said shift lever is prevented by said blocking element from being shifted to its reverse drive position, and a link interconnecting said clutch control and said blocking element whereby said blocking element is in its blocking position when said clutch control is in its clutch engaged position.

\* \* \* \* \*